United States Patent [19]

Golyanovsky et al.

[11] 4,202,156
[45] May 13, 1980

[54] ROTARY MOWER

[76] Inventors: Anton V. Golyanovsky, proezd Solomennoi Storozhki, 8, kv. 12, Moscow; Albert P. Kuznetsov, Dirizhabelnaya ultisa, 28, kv. 25, Dolgoprudny Moskovskaya oblast, both of U.S.S.R.

[21] Appl. No.: 913,070

[22] Filed: Jun. 6, 1978

[30] Foreign Application Priority Data

Jun. 10, 1977 [SU] U.S.S.R. .................... 2493781[I]

[51] Int. Cl.² ............................................ A01D 35/264
[52] U.S. Cl. .................................... 56/13.6; 30/276; 56/295
[58] Field of Search .................... 56/295, 13.6, 6, 192

[56] References Cited

U.S. PATENT DOCUMENTS

| 349,105 | 9/1886 | Keller | 56/295 |
| 3,254,481 | 6/1966 | Tweedale | 56/295 |

Primary Examiner—Jay N. Eskovitz
Attorney, Agent, or Firm—Robert E. Burns; Emmanuel J. Lobato; Bruce L. Adams

[57] ABSTRACT

A rotary mower cutter having a reciprocably actuated cutter-bar mounting axially spaced thereon for rotation a plurality of rotary discs constituting cutters. The discs are each provided with pivoted eccentric masses responsive to rotation of the discs to develop a flywheel movemment on each disc cutter.

4 Claims, 3 Drawing Figures

ROTARY MOWER

BACKGROUND OF THE INVENTION

The invention relates to agricultural machine-building and more particularly, to rotary mowers.

This device can be utilized in all the branches of industry where torque must be transmitted to a multitude of working elements all of them rotating at the same speed.

Known in the prior art are rotary mowers intended for mowing vegetation by means of cutting elements mounted on a cutterbar, each cutting element being provided with an individual drive in the form of a shaft and a bevel gear drive. The entire system of shafts and bevel gears is incorporated in the mower cutterbar.

In some other prior art mowers each cutting element is driven by V-belt transmissions, the entire drive system also being accommodated in the mower cutterbar.

Also known in the prior art are mowers whose cutting elements are driven from a spur-gear speed reducer whose casing serves simultaneously as the supporting beam of the cutterbar.

Among the disadvantages of the prior art rotary mowers is the complexity of the drive of the cutting elements and, as a result, a low efficiency of the mechanism as a whole. Besides, the above-mentioned devices are characteriszed by a high metal content and are extremely cumbersome. Their operation is inevitably accompanied by distortion of the cutterbar with the cutting elements which interferes with normal functioning of the gear transmissions.

SUMMARY OF THE INVENTION

The main object of the invention resides in providing a reliable and simple drive of a rotary mower with a high efficiency.

Another object of the invention resides in reducing the metal content and overall dimensions of the rotary mower.

Still another object of the invention resides in providing a device which is easy to operate.

These and other objects are achieved by providing a rotary mower which comprises a cutterbar carrying axles secured perpendicularly to the soil surface and provided with rotary cutting elements made as discs wherein, according to the invention, the cutterbar mounts a mechanism for imparting to the cutterbar a reciprocating or plane-parallel motion around the circumference in the plane of the soil surface while the cutting elements are freely-mounted on the supporting axles and provided with a means for their unbalancing.

It is practicable that the unbalance of the cutting elements should be created by articulating movable eccentric masses to said cutting elements.

In another version of the invention the unbalancing of the cutting elements is achieved by a ring rigidly installed on each cutting element so that the axle of the cutting element is located inside of this ring and permits the inner surface of the ring to roll freely over to the external surface of the axle.

It is also practicable that the cutting elements should be provided with overrunning clutches for rotating the cutting elements in the preset direction.

The cutterbar drive mechanism can be either of the crank-and-slide or parallel-link type.

The substance of the present inventin resides in the following.

As the cutterbar perfroms reciprocating or plane-parallel motion around the circumference in the plane of the soil, the axles secured on the cutterbar interact with the free-mounted unbalanced cutting elements and rotate the latter, thereby transmitting torque to them. Calculations and experiments have shown that stable starting of the cutting elements calls for a minimum distance "e" from the axis of rotation to the center of gravity of the cutting element. However, as the cutting elements rotate, a strong flywheel moment can be achieved only when this distance is at a maximum. For this purpose the eccentric masses ensuring the unbalancing of the cutting elements are made movable and are articulated to the cutting elements. At the moment of starting of the cutting elements the eccentric masses are displaced towards the axis of rotation and when operating the mower the centrifugal forces move them towards the periphery of the cutting elements or discs, thereby ensuring a strong flywheel moment. The articulation between the unbalanced masses and the cutting elements can have the hinge axis arranged either parallel to the soil surface or perpendicularly to it. In one version of unbalancing of the cutting elements each cutting element has a ring arranged around the axle of the cutting element so that the inner surface of the ring is capable of rolling freely around the external surface of the axle. Such an arrangement of the cutting elements simplifies their mounting and dispenses with bearing units.

The overrunning clutches mounted on the cutting elements ensure their rotation in the preset direction, partly counter balancing the entire system.

The cutterbar can be driven by various conventional mechanisms, for example crank-and-slide or parallel-link drives.

Owing to such a design of the drive, the overall dimensions and metal content of the mower are considerably reduced.

BRIEF DESCRIPTION OF THE DRAWINGS

The above-mentioned and other objects and advantages of the present invention will be apparent from the following description of an embodiment of the rotary mower and from the accompanying drawings in which.

DESCRIPTION OF THE PREFERRED EMBODIMENTS

Figure 1:
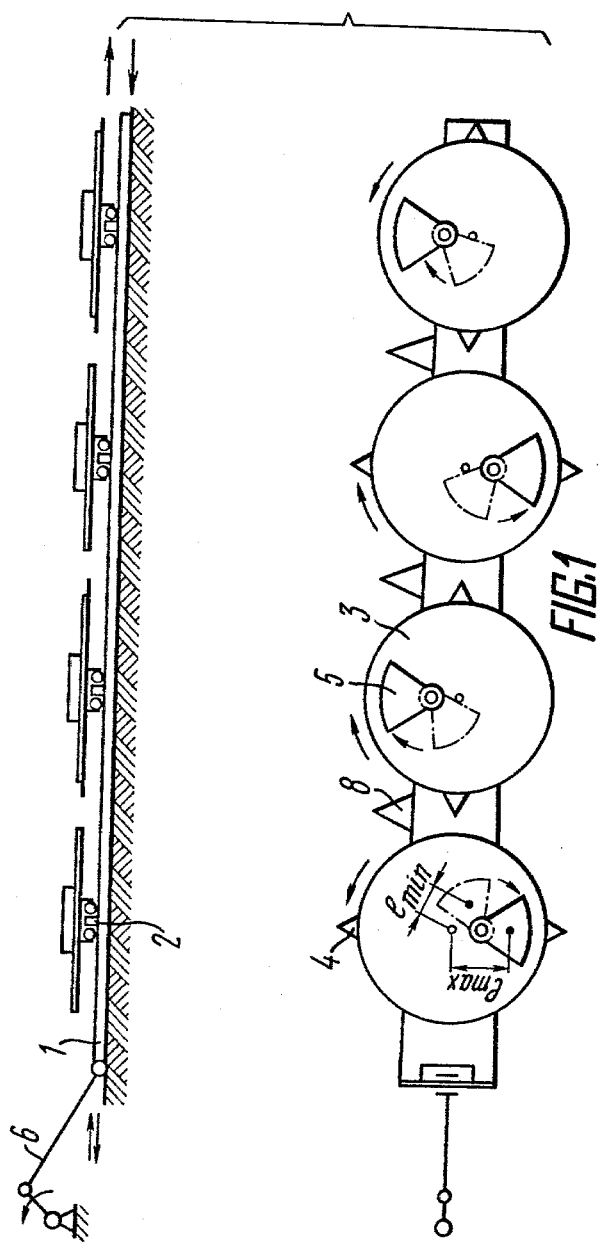
FIG. 1 is a general view of the rotary mower according to the invention, with a crank-and-slide drive and with the axles of the eccentric mass hinges arranged perpendicularly to the surface of the soil.
Figure 2:
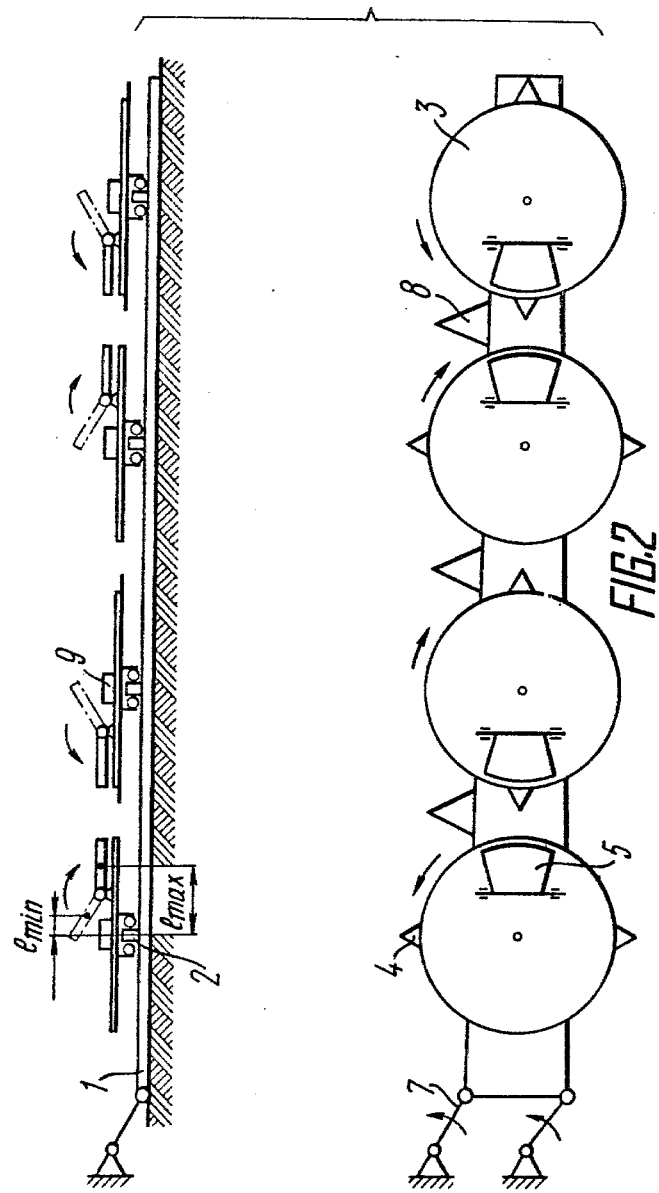
FIG. 2—same, but with a parallel-link drive and the axles of the unbalanced mass hinges arranged parallel to the surface of the soil.

The rotary mower (FIGS. 1,2) consists of a cuttingbar 1 carrying axles 2 secured perpendicularly to the soil surface. The rotary cutting elements or discs 3 with cutters 4 are free-mounted on the axle 2. The eccentric masses 5 are articulated to the cutting elements 3 and held in the position shown by dotted lines in the drawing with the aid of springs (not shown in the drawing). In FIG. 1 the axles of the hinges of the eccentric masses 5 are perpendicular to the soil surface while in FIG. 2 they are shown in a parallel position to the soil surface. The cutterbar 1 can be driven either by a crank-and-slide mechanism 6 or a parallel-link mechanism 7. In the first case the cutterbar is made to perform a reciprocating motion and in the second case, a plane-parallel motion. Installed on the cutterbar 1 between the cutting elements 3 are dividers 8 intended to divide vegetation and bring it to said cutting elements. The cutting elements 3 are provided with overruning clutches 9 which permit the cutting elements to rotate in a preset direction.

Figure 3:
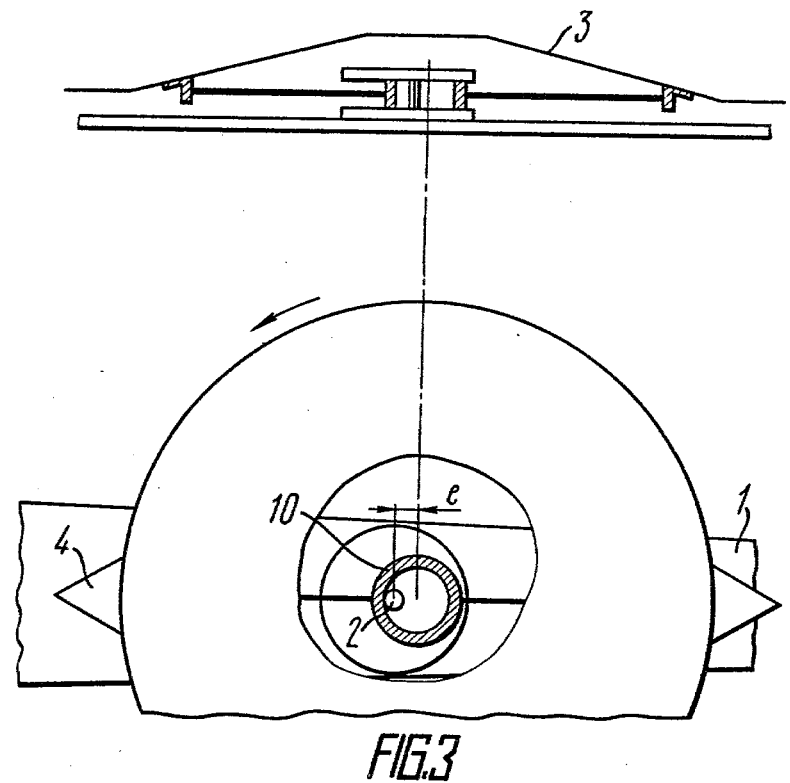
FIG. 3 is a version of mounting the cutting element with a rigid ring which can roll freely around the external surface of the axle.

In FIG. 3 showing a version of mounting the cutting element, the ring 10 is rigidly linked with the cutting element 3 and loosely mounted on the axle 2.

The device functions as follows.

As reciprocating or plane-parallel motion around the circumference is imparted to the cutterbar 1 by means of a crank-and-slide or a parallel-link drive, the eccentric cutting elements 3 start rotating. Both calculations and experiments have shown that for stable starting of the cutting elements the distance "e" through which the center of gravity of the cutting element is displaced from the axis of rotation should be at a minimum. With this purpose in view, when the cutting elements 3 are immovable, the eccentric masses 5 acted upon by springs (not shown in the drawings) are turned towards the rotation axis of the cutting elements, thus ensuring a minimum value of "e". When the cutting elements 3 rotate under the effect of centrifugal forces, the eccentric masses turn towards their periphery thus creating a maximum useful moment for overcoming the forces of resistance to mowing. The dividers 8 mounted on the cutterbar 1 between the cutting elements 3 tilt the plants getting between the cutting elements 3 to their cutters 4.

If the cutting element 3 is mounted with a clearance in the axle-ring pair, said cutting elements start rotating during vibrations of the cutterbar 1 due to their unbalance. The inner surface of the ring 10 rolls around the external surface of the axle 2, thus dispensing with the need for bearing units.

It can be seen from the description that the rotary mower according to the invention is characterized by a considerably simplified drive of the cutting elements with a simultaneous reduction in the metal content and overall dimensions of the device.

The present device ensures reliable mowing, is simple in manufacturing and easy to service.

What we claim is:

1. In a rotary mower, a cutter-bar movable axially reciprocably in a horizontal plane, a plurality of rotatably driven cutters mounted on said cutter-bar, means dynamically developing flywheel momentum on the cutters individually, and the last-mentioned means comprising eccentric masses pivoted on the cutters.

2. In a rotary mower according to claim 1, in which the cutters are rotary driven discs.

3. In a rotary mower according to claim 2, including means for rendering rotary motion of said cutter orbital.

4. In a rotary mower according to claim 1, in which said cutters comprise discs disposed spaced axially on said cutter-bar and rotatably in substantially a common plane.

* * * * *